(12) United States Patent
Valenzuela et al.

(10) Patent No.: US 8,184,692 B2
(45) Date of Patent: May 22, 2012

(54) DISTRIBUTED AND AUTOMATED VIDEO ENCODING AND DELIVERY SYSTEM

(75) Inventors: Jaime Arturo Valenzuela, Redlands, CA (US); Hassan Hamid Wharton-Ali, Pacific Palisades, CA (US)

(73) Assignee: Framecaster, Inc., Glendale, CA (US)

( * ) Notice: Subject to any disclaimer, the term of this patent is extended or adjusted under 35 U.S.C. 154(b) by 1275 days.

(21) Appl. No.: 11/903,770

(22) Filed: Sep. 24, 2007

(65) Prior Publication Data
US 2008/0084926 A1  Apr. 10, 2008

Related U.S. Application Data

(60) Provisional application No. 60/847,296, filed on Sep. 25, 2006.

(51) Int. Cl.
*H04N 11/04* (2006.01)
(52) U.S. Cl. ......... 375/240.02; 375/240.03; 375/240.12; 375/24.016; 382/232; 386/214; 386/232; 386/263; 386/343; 709/230; 709/231; 709/233
(58) Field of Classification Search .................. None
See application file for complete search history.

(56) References Cited

U.S. PATENT DOCUMENTS

| | | | | |
|---|---|---|---|---|
| 5,146,325 A * | 9/1992 | Ng | ............................. | 348/384.1 |
| 5,565,920 A * | 10/1996 | Lee et al. | ................. | 375/240.11 |
| 5,818,537 A * | 10/1998 | Enokida et al. | ............... | 348/441 |
| 6,339,619 B1 * | 1/2002 | Sugiyama | ................ | 375/240.26 |
| 6,680,976 B1 * | 1/2004 | Chen et al. | ............... | 375/240.26 |
| 6,847,682 B2 * | 1/2005 | Liang | ........................ | 375/240.12 |
| 6,944,221 B1 * | 9/2005 | Keesman | .................. | 375/240.02 |
| 6,956,901 B2 * | 10/2005 | Boroczky et al. | ........ | 375/240.03 |
| 7,047,305 B1 | 5/2006 | Brooks et al. | | |
| 7,215,384 B2 * | 5/2007 | McVeigh et al. | .............. | 348/699 |
| 7,382,796 B2 * | 6/2008 | Haberman et al. | ............ | 370/429 |
| 7,450,182 B2 * | 11/2008 | Nakajima et al. | .............. | 348/625 |
| 7,505,590 B1 * | 3/2009 | Apostolopoulos | ............ | 380/210 |
| 7,773,581 B2 * | 8/2010 | Punj et al. | ...................... | 370/352 |
| 7,912,090 B2 * | 3/2011 | Yu et al. | ........................ | 370/477 |
| 7,965,771 B2 * | 6/2011 | Wu et al. | ................... | 375/240.12 |

(Continued)

FOREIGN PATENT DOCUMENTS

EP  0961490 A2  12/1999

(Continued)

OTHER PUBLICATIONS

Pinnacle Systems, MPEG-2 White Paper, Feb. 29, 2000, v0.5, pp. 1-21.*

(Continued)

*Primary Examiner* — Backhean Tiv
(74) *Attorney, Agent, or Firm* — Nixon Peabody LLP; Khaled Shami

(57) ABSTRACT

At a user or client site, a user initially visits a website hosted by a partner, and following an initial interaction with the website, the user is provided with various software from an administrator website. The software enables the user to download information, such as a video file, to the partner website. The information is encoded in a format that was pre-selected by the partner so that the delivery process is streamlined for the partner. In addition, for further efficiency, the delivery process from the user to the partner is implemented substantially simultaneously with the encoding.

2 Claims, 13 Drawing Sheets

U.S. PATENT DOCUMENTS

| | | | |
|---|---|---|---|
| 2002/0172281 A1* | 11/2002 | Mantchala et al. | 375/240.12 |
| 2003/0018978 A1 | 1/2003 | Singal et al. | |
| 2005/0089104 A1* | 4/2005 | Kim | 375/240.27 |
| 2005/0111545 A1* | 5/2005 | Prabhakar et al. | 375/240.03 |
| 2005/0248802 A1* | 11/2005 | Nomura et al. | 358/1.15 |
| 2006/0104366 A1* | 5/2006 | Huang et al. | 375/240.27 |
| 2008/0084926 A1* | 4/2008 | Valenzuela et al. | 375/240.01 |

FOREIGN PATENT DOCUMENTS

| | | |
|---|---|---|
| EP | 1463323 A1 | 9/2004 |

OTHER PUBLICATIONS

International Search Report and Written Opinion in International Application No. PCT/US2007/020846, dated Oct. 25, 2010.

* cited by examiner

Profiles are transferred from Admin website to Partner page that contains AWE plug-in Videos are converted and delivered simultaneously to the partner server directly from the submitting computer

DISTRIBUTED AND AUTOMATED VIDEO ENCODING AND DELIVERY SYSTEM

CROSS-REFERENCE TO RELATED APPLICATIONS

This application claims the benefit of U.S. provisional patent application No. 60/847,296, filed on Sep. 25, 2006, entitled "Automatic Web Encoding and Dynamic Encoding Protocol."

BACKGROUND OF THE INVENTION

1. Field of the Invention

The invention relates to digital video encoding and distribution.

2. Description of the Related Art

Video encoding is time consuming and complicated, and is often a multi-step process that involves using more than one tool. This is a major challenge to video aggregators who receive videos in all possible formats. Video tapes, DVDs, CDs, and all kinds of media files are submitted daily by the thousands world wide. These video submissions then have to be converted and "normalized" to one format for editing, broadcasting and publishing.

Some tools currently in the market are in the form of software and hardware applications for post-production facilities. These tools encode video material after a tape or file has been received by the facility. They are complicated to use and require and expert staff to operate them. Furthermore, they do nothing to help ease the process for people submitting their content.

BRIEF SUMMARY OF THE INVENTION

As the number of videos submitted to news agencies, viral video shows and Internet video sites increases, it is advantageous to design an automated video conversion and distribution system over the Internet or similar network that enables users to easily submit video while at the same time delivering the proper format to these media companies. Further, a self-scalable system can be obtained if the transfer and conversion process is performed at the submitting computer as opposed to the receiving company's servers. In accordance with an embodiment of the invention, automatic web encoding (AWE) is provided using a web framework of plug-ins that allow users to submit video and audio content while simultaneously converting and delivering the output to a local or remote location on a computer network. Features of embodiments of the invention may include individual encoding and decoding filters for all file formats, individual image and audio processing filters, multiplexing and de-multiplexing features, IP transmission protocol output filters (FTP, UDP, HTTP, etc.), and so forth.

It will be appreciated that delivering a video as it is being encoded can be more efficient than performing the encoding first and then transmitting the file. But greater advantage can be achieved by adjusting key encoding parameters dynamically to maintain throughput and optimize for quality.

DETAILED DESCRIPTION OF THE INVENTION

Figure 1:
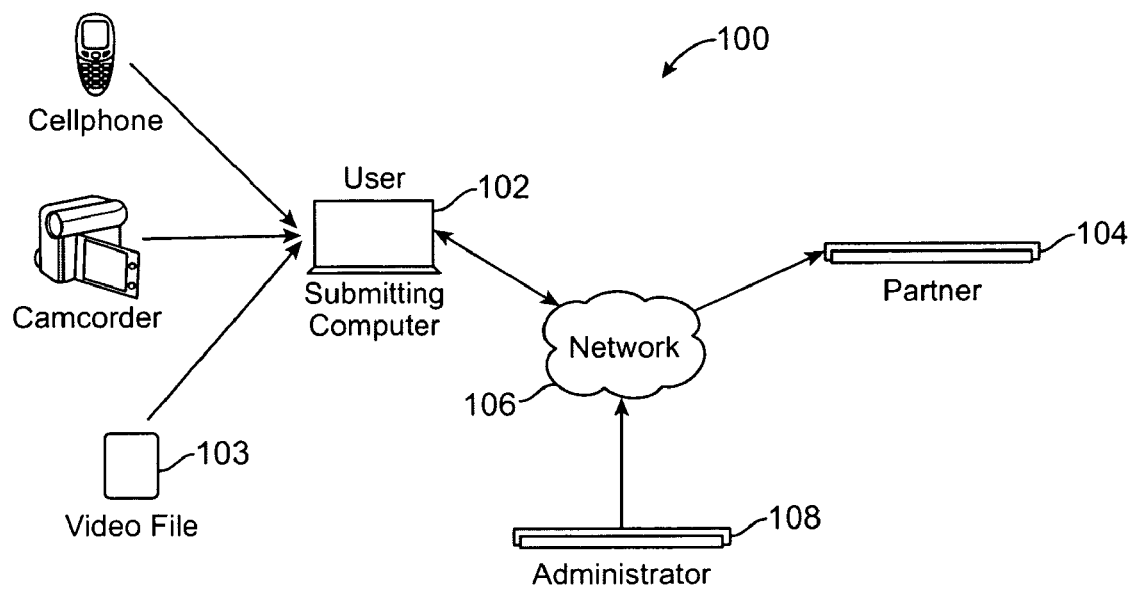
FIG. 1 is a schematic diagram of an example delivery system.

Embodiments of the present invention are described herein in the context of digital video encoding and distribution. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-and-business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, processors and microprocessors, field programmable gate arrays (FPGAs), application specific integrated circuits (ASICs), or the like, may also be used without departing from the scope and spirit of the inventive concepts disclosed herein.

The automatic web encoding (AWE) platform is a distributed video encoding and delivery application that is designed for use for example by digital video aggregators and distributors (referred to herein as partners). AWE includes a web plug-in whereby partners can customize the look and feel and video encoding format and parameters in which they desire to receive video submissions from the users. Partners customize these settings by creating profiles that are stored at a service provider or administrator site. The profiles are applied to each instance of the web (AWE) plug-in in a partner's web page. At the user or client site, a user initially visits a website hosted by the partner, and following an initial interaction with the website, the user is provided with various software from an administrator website. The software enables the user to download information, such as a video file, to the partner website. The information is encoded in a format that was pre-selected by the partner so that the delivery process is streamlined for the partner. In addition, for further efficiency, the delivery process from the user to the partner is implemented substantially simultaneously with the encoding.

FIG. 1 illustrates a high level view of the architecture of a distribution system 100. Information processing or encoding takes place at the submitting user computer 102. The information originated from any one of multiple possible sources 101, such as a video camera, cellular telephone, or the like. The video files 103 are simultaneously delivered to a partner 104 from the submitting computer 102, by way of a network 106, such as a WAN, LAN, Internet, or combination of these. The video processing and delivery are conducted substantially simultaneously, as detailed below, in accordance with a partner profile that is stored at the service provider or administrator 108 as further detailed below.

Figure 2:
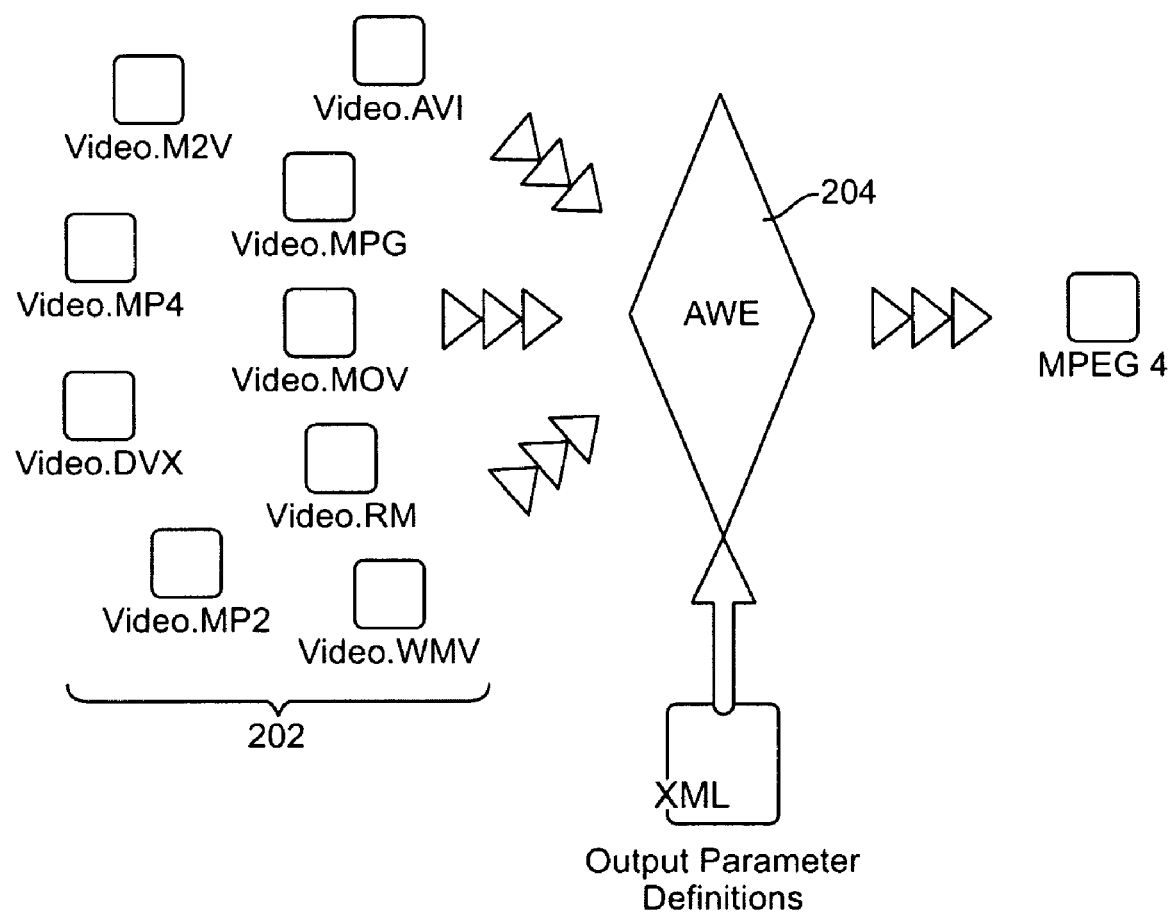
FIG. 2 is a schematic diagram showing the operation of AWE.
Figure 3:
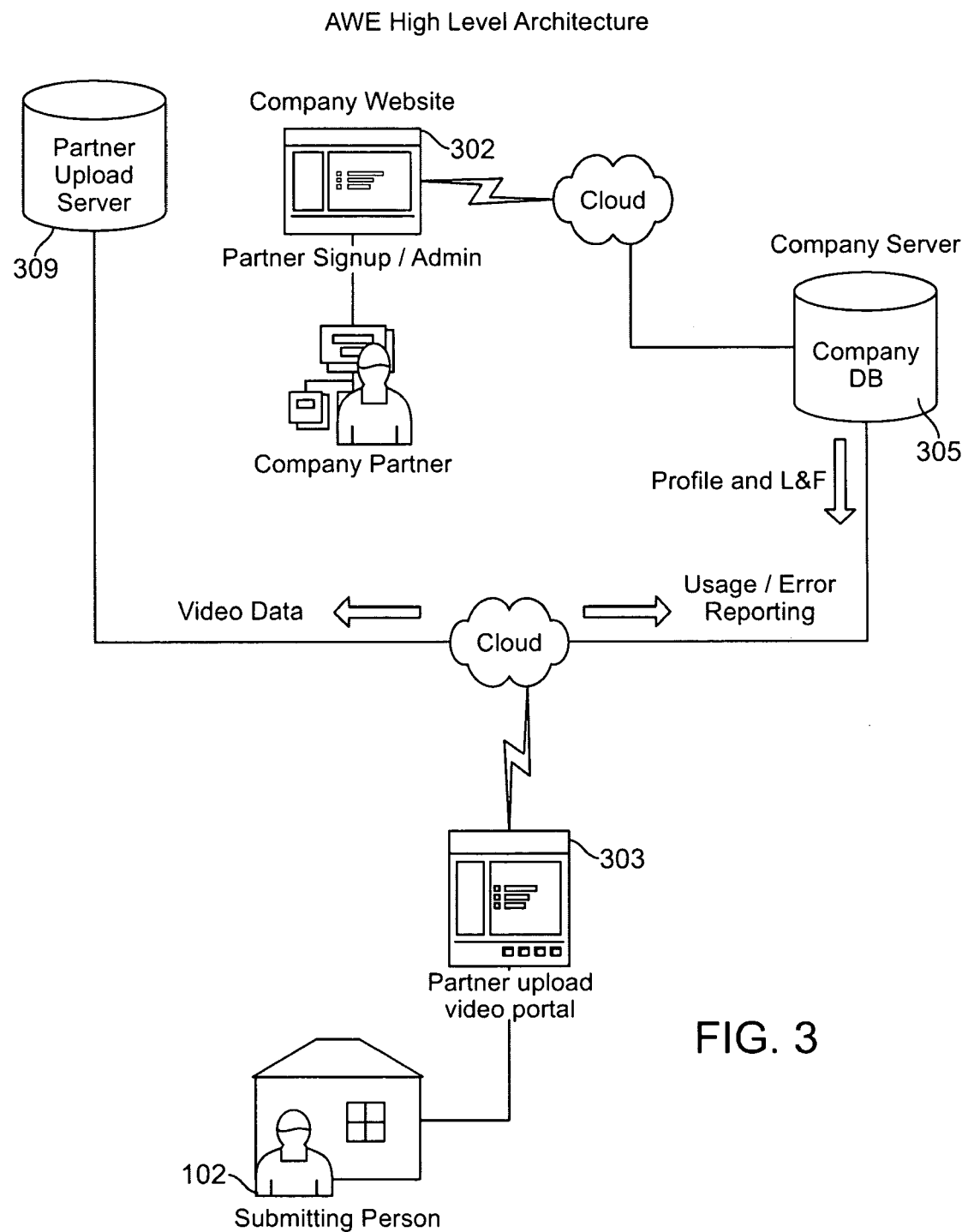
FIGS. 3 and 3A-3D are schematic diagrams of various aspects involved with the AWE platform.
Figure 3A:
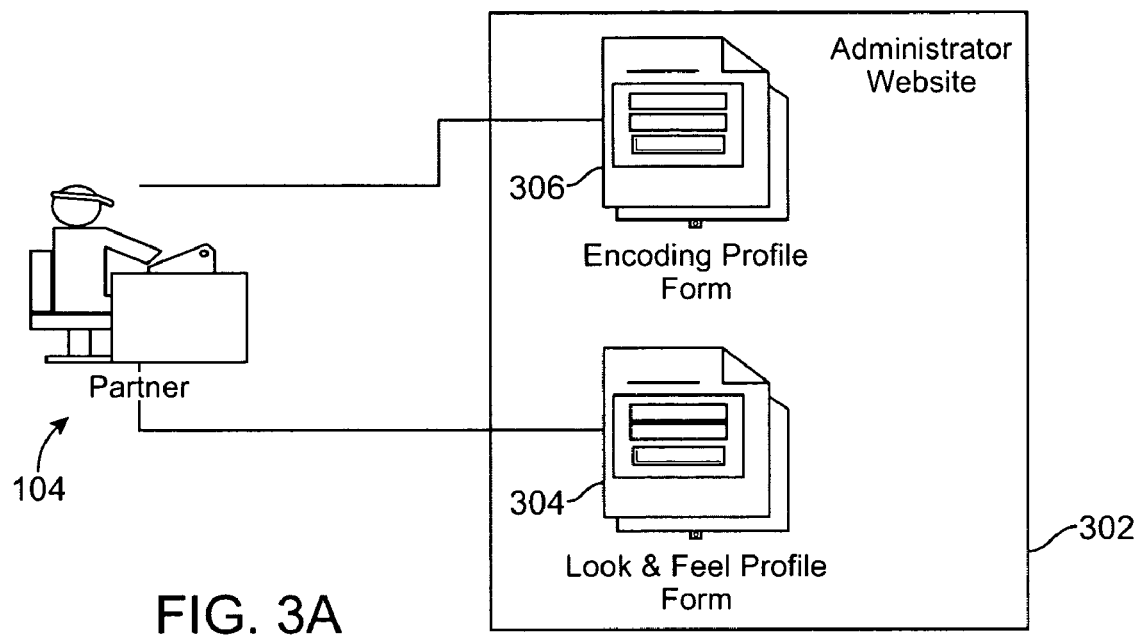
Figure 3B:
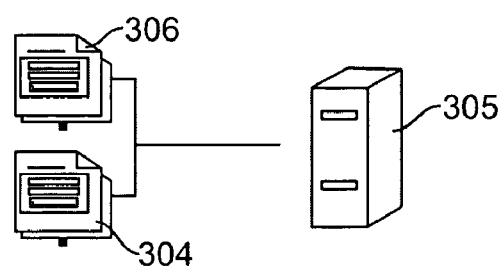
Figure 3C:
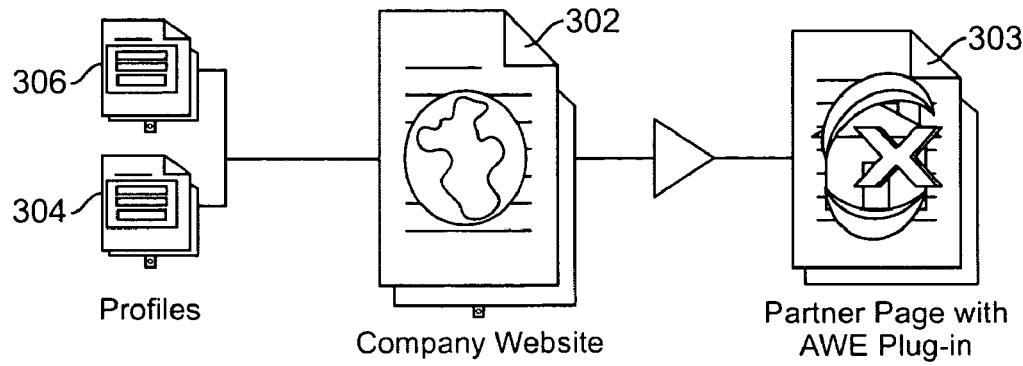
Figure 3D:
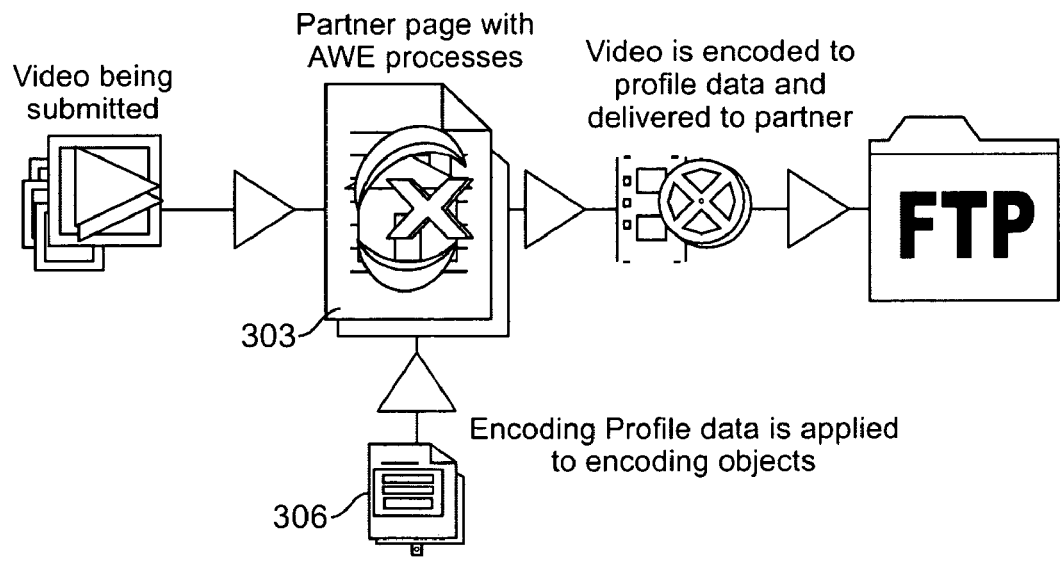

As illustrated diagrammatically in FIG. 2, input video files 202 having a range of different formats are normalized at the submitting computer using the AWE platform 204 to conform to the specifications of the partner 104 (FIG. 1) with minimal, if any, user intervention. For illustrative purposes only, the selected target normalization format 206 is shown to be MPEG4, although other formats are also contemplated.

Figure 4:
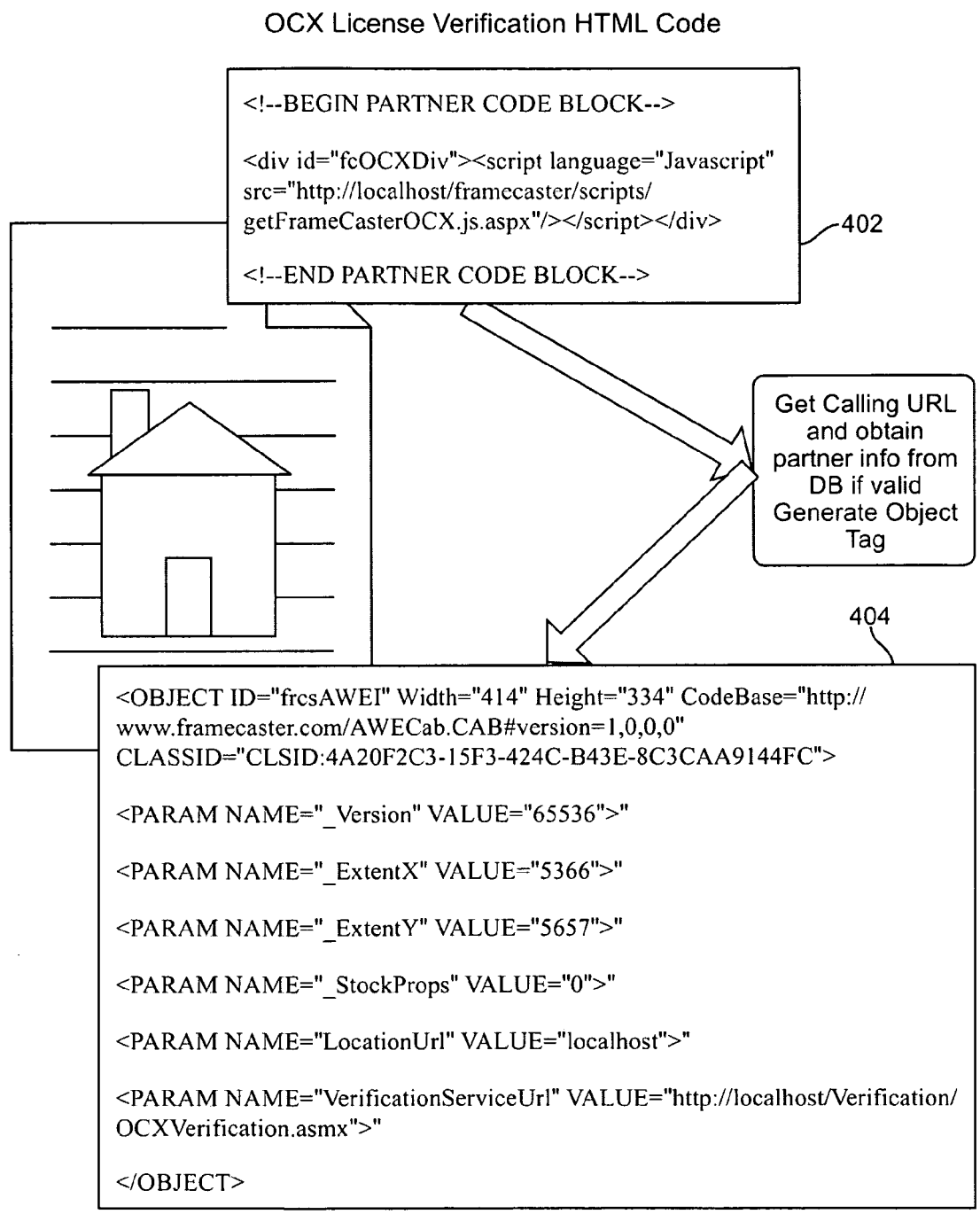
FIG. 4 is a schematic diagram of a verification process.

With reference to FIGS. 3 and 3A-D, each partner 104 (multiple partners are contemplated) creates an account on the service provider or administrator website 302 and hosts its own website 303 accessible by its users (submitting computers 102, FIG. 1). It will be appreciated that the term website as used herein is a collection of Web pages, images, videos or other digital assets that is hosted on one or several Web server(s). As used herein, it may also refer to the hosting one or more servers or machines, and these may or may not be at the same physical location. They are configured to deliver and receive information to and from one another or other machines in the network or in other networks. The service provider or administrator website 302 provides partners 104 with user interfaces to choose color and "skins" 304 to be applied to a web plug-in, as well as a user interface to select and set up encoding profiles 306. These profiles are created when a partner account is opened and stored at the service provider or administrator server 305. They are retrieved and applied by a partner's user 102 when the user is submitting files to the partner, as detailed further below. The partner's encoding profile 306 stored at the service provider or administrator server 305 and implemented by the user may include a description of video codecs and descriptions of video stream parameters, such as bitrates, constant or variable bitrates, frame size and resolution, frame rates, and so forth. Partners 104 design their encoding profile settings as well as an FTP (file transfer protocol) address for the transfer of the video once encoded. As seen in FIG. 4, partners 104 receive an html object tag 402 after the initial interface, encoding profile 306, and FTP set-up process. This is a generic tag that, when accessed by a user, in turn makes a call to an administrator webservice to verify that the URL (uniform resource locator) where it is embedded—that is, the partner's website—matches a valid partner 104. In turn, the webservice generates another web object tag 404 that contains the actual code to embed AWE plug-in components in the partner page 303. The video profiles, colors and skins, and FTP information are applied to every instance of the plug-in when a user 102 accesses the partner website that contains it. The first time that one of the partner's users 102 opens the page 303, the user's browser will download the AWE plug-in installation file from the service provider or administrator website 302 server. The AWE plug-in itself is a collection of software components that encapsulate specific functionality as detailed further below. This process only takes place the first time the page 303 containing the plug-in is opened and when software updates are released.

Before running, the AWE plug-in component verifies that the partner web page 303 in which it is embedded belongs to a licensed partner 104. To achieve this, licensed partners 104 receive the html object tag 402 to include in their web page. When one of the partner's users 102 opens web page 303, a call to the web service of the service provider or administrator 108 is made to initiate a license verification process. When the web service receives a call, it extracts the URL of the calling page to be used to look up the domain name from the partner's database and extract a partner ID. If this partner ID is incorrect, the call will fail. When a valid partner ID is retrieved for a domain, the web service returns an object tag 404 that contains the code to embed the AWE plug-in component and its initialization parameters. At this point the component will be instantiated and initialized with the parameters in the object tag 404 and will call another webservice in the service provider or administrator 108 website which will be termed OCXVerificationService. If a validation succeeds, the method returns true and will fill in the partnered data member with a valid partner ID.

After successful license validation, the AWE plug-in component receives a valid partner ID which is used to retrieve the "look and feel" 304 and encoding 306 profiles from the service provider or administrator server 305 or associated database. This is accomplished by calling a web service in the service provider or administrator website, which is termed OCXWebService.

Figure 5:
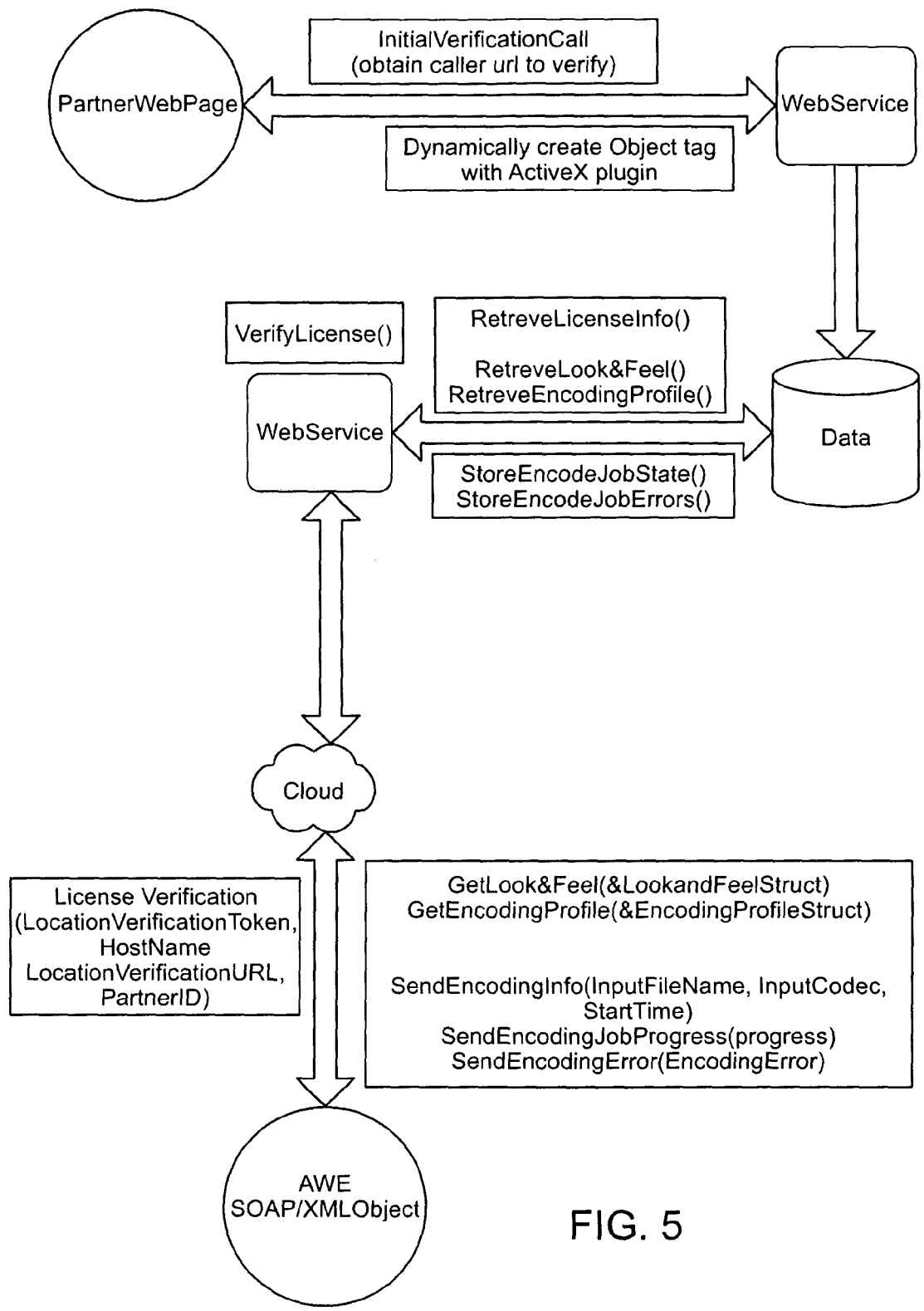
FIG. 5 is schematic depiction of a verification and profile data exchange process.

The AWE plug-in makes a call to the OCXWebService which in turn retrieves the profile information in xml form for the supplied partner ID. The AWE plug-in component then uses the supplied profile data to initialize. FIG. 5 depicts the verification and profile data exchange process.

The AWE plug-in is a multi dialog application with color customization that embeds in web page 303. The look and the feel of these dialogs upon instantiation at the user 102 location are fully customizable, as selected by the partner 104 and stored at service provider or administrator server 305 or an associated database. Color, shape and number of buttons and features that appear available to a user are chosen by a company partner and specified in the look and feel profile 304. The look and feel profile 304 is obtained by the AWE plug-in via webservices in xml format. Upon initialization, the AWE plug-in uses the look and feel data to create its dialogs according to the look and feel profile 304.

Encoding profile parameters are stored in the encoding profile 306. Encoding parameters are applied to an encoding object when a video is submitted. The encoding profile 306 is retrieved via webservices from the company website. Encoding profiles specify, for example, the file format, video codec, audio codec to be applied to the to-be delivered file as well as more specific parameters such as frame rate and frame resolution.

Figure 6:
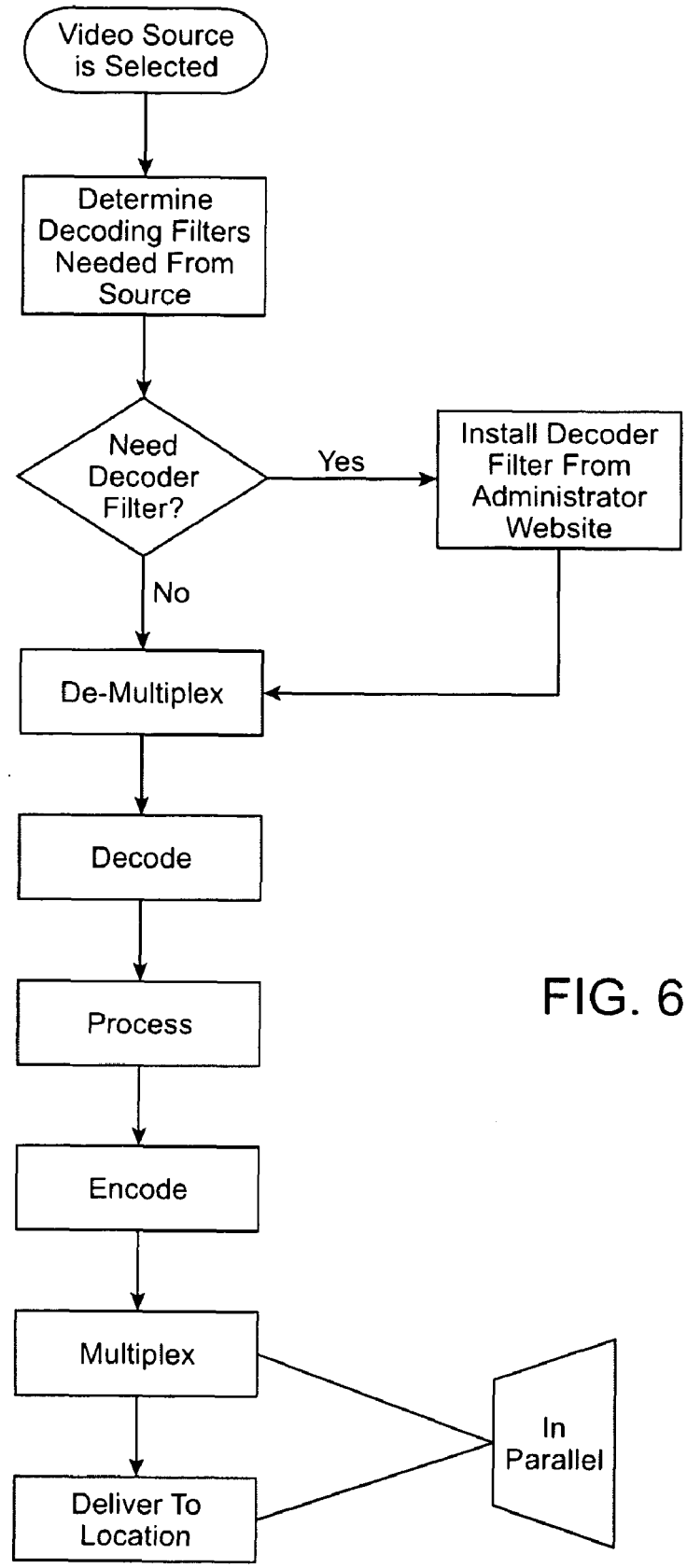
FIG. 6 is a schematic diagram depicting an encoding process.

With respect to encoding, video creator objects in the form of libraries or software components create specific video types. For example, MPEGCreator objects are used to produce mpeg1, mpeg2, mpeg4 video files with audio in PCM, AAC, MP3 and MPL2. And WMVCreator objects create videos in WMV7, WMV8 and WMV9 formats with WMA and WMA Professional audio codecs. When a video encoding process begins (details provided below), other dialog windows within the AWE plug-in update the user 102 on encoding progress, elapsed time and gives a preview of the resulting file. The encoding process is described in the flow diagram of FIG. 6

Figure 7:
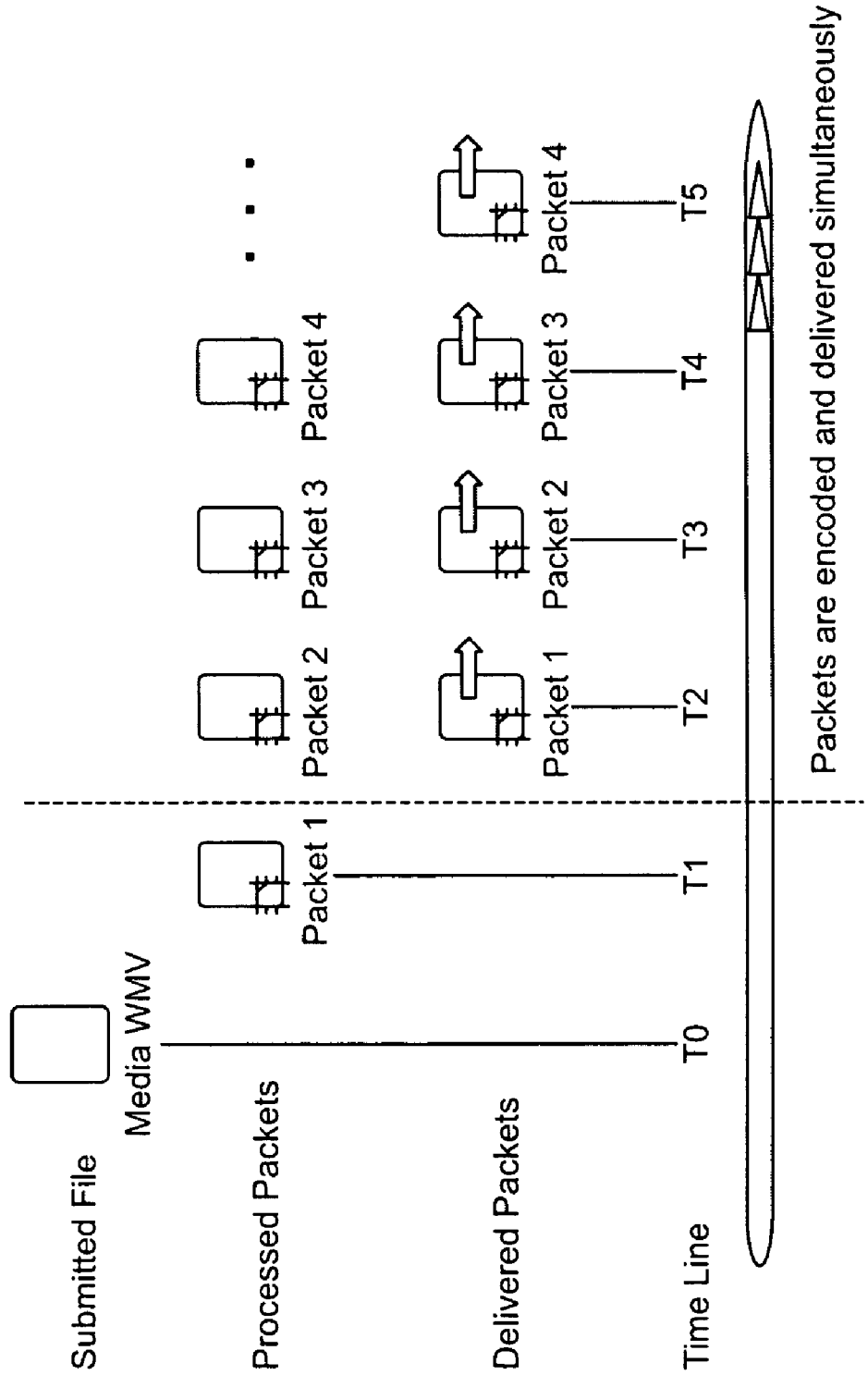
FIG. 7 is a schematic depiction of the substantially simultaneous encoding and transmission process.

While encoding is performed, an encoded video packet is delivered to receiving or upload server 309 (FIG. 3) of the partner 104. This is done by calling a file delivery object. The delivery objects are client applications that implement different delivery protocols. The substantially simultaneous encoding and delivery process is depicted in FIG. 7.

Figure 8:
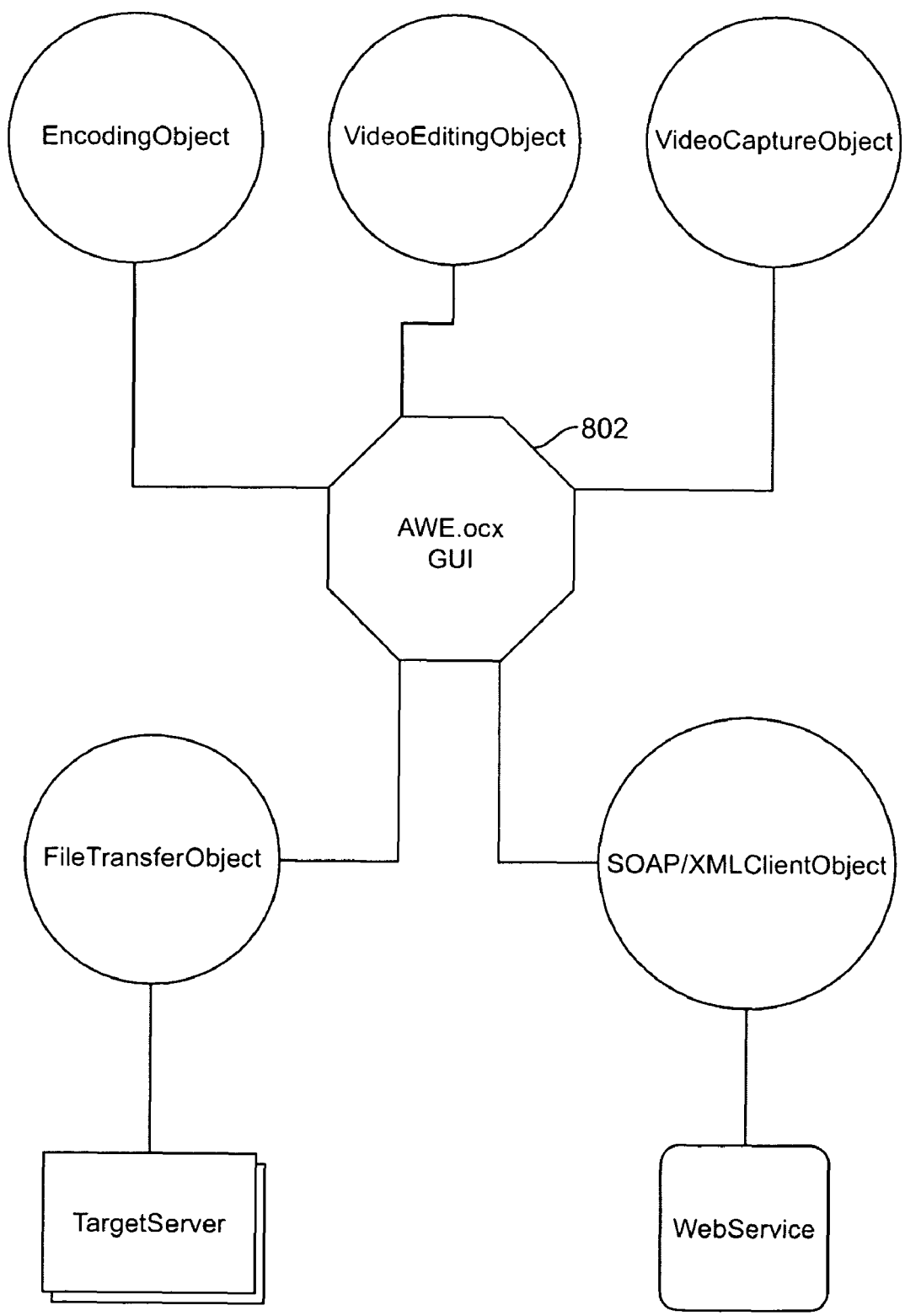
FIG. 8 is a block diagram showing components and objects of the AWE platform.

The AWE plug-in is a client application downloaded on the user computer 102 and having many components that get called as needed to perform a particular task, as can be seen from FIG. 8. The center component 802 calls different components that interact with the service provider or administrator server 305 and/or partner server 309 and website 303 to verify licenses, retrieve look & feel and encoding profiles, encode, and deliver a file via FTP. It is also the GUI (graphical user interface) for the AWE plug-in platform and is composed of multiple dialogs that enable the user 102 to select the source of the video the user would like to submit, play and trim files, capture live from a webcam, import a video from a DVCam via firewire, or from a cellular telephone via Bluetooth or USB connection, and the like.

The dialogs are configured to guide the user through the submission process in an intuitive manner. For instance, first, a user 102 selects the video source. Second, the user 102 selects the file, capture, or import depending on the device from which the source video originates. Third, videos can be reviewed and the beginning, end, or other portions can be edited or "trimmed". Then the use can submit the video. When the user initiates submission, encoding of the video into the format pre-selected by the partner 104 and indicated in the encoding profile that was downloaded to the user takes place automatically. Encoding takes place at the user location, and is performed substantially simultaneously with delivery, such that while a portion of the data stream, for example a packet or a GOP (group of pictures) or some other increment of information, is being delivered, a succeeding portion is being encoded in preparation for delivery. The user waits for the completion while watching a progress dialog which updates a progress bar and the elapsed time. When the submission is complete, a success dialog appears and gives the user the opportunity to make another submission or to terminate the application.

Dynamic Encoding Process

Digital video is the representation of a sequence of images and sound in a binary format. This binary representation produces files that are relatively large—in the order of a couple of Giga Bytes per minute of video—and are often compressed.

Video compression reduces the number of bits required to state a sequence of image and sound in a binary file. This reduction in file size requires that computations be performed at both the compression and decompression stages.

There are several algorithms used in video compression today that are applied to individual pictures by themselves (intra-picture compression) and others that take advantage of similarities between adjacent frames in the sequence (inter-picture compression.)

Intra-picture compression or coding simply compresses each frame or field, in a sequence of frames, as a self contained compressed picture. Several methods are available today to produce loss-less or lossy compressed pictures that include JPEG, DCT, RLE or LZW. The images produced by this compression method are referred to as I frames.

Inter-picture compression or coding exploits the similarities between successive pictures in a sequence. Picture differences between frames are computed and transmitted instead of the full frame information. This method potentially saves a great deal of redundant picture information. There are often picture elements that remain static across a sequence of images and there are other elements that retain their shape but change position due to motion. Identifying such image objects and computing their change in position across a sequence of frames is known as motion estimation. Images produced with this type of compression are called P or B frames. P frames are only dependent on the prior frame whereas B frames depend on both prior and subsequent frames.

Video encoding and compression algorithms often include a combination of these types of compressed images, but the image sequence starts with an I frame and is typically followed by a combination of P or B frames. A group of pictures (GOP) is then defined as a sequence of frames that start with an I frame which is followed by a combination of B and P frames. In a compressed video stream, a GOP is delimited by two I frames. The number of P and B frames in the GOP could be constant and periodic, which produces a constant bit rate video stream CBR, or it could be variable and non periodic, which produces a variable bit rate video stream VBR.

With CBR, the quality of the picture can vary across individual frames as complex images across the GOP can introduce artifacts. On the other hand, VBR could produce a constant image quality as algorithms that interpret the complexity of the images in the sequence can be used to determine what compression algorithm is best.

Figure 9:
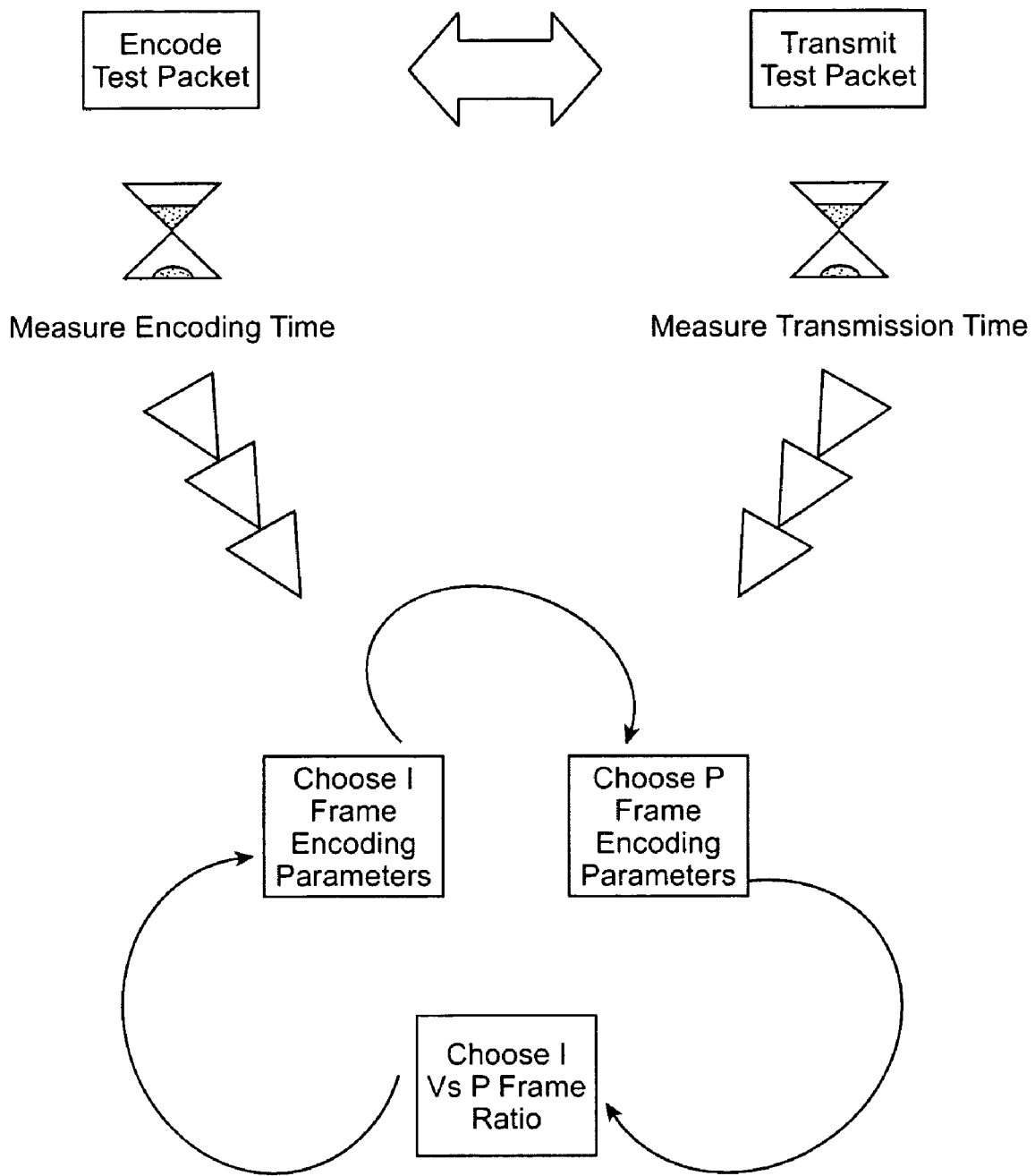
FIG. 9 is a diagrammatic example of a DEP process.

The Dynamic Encoding Protocol (DEP) is essentially a method for encoding and transmitting compressed video packets that adjusts the encoding according to the connection speed to deliver sustained video payloads while preserving image quality. DEP takes advantage of common video compression techniques and uses any available digital file transfer protocols or mechanisms. FIG. 9 is a diagrammatic example of a DEP process.

Figure 10:
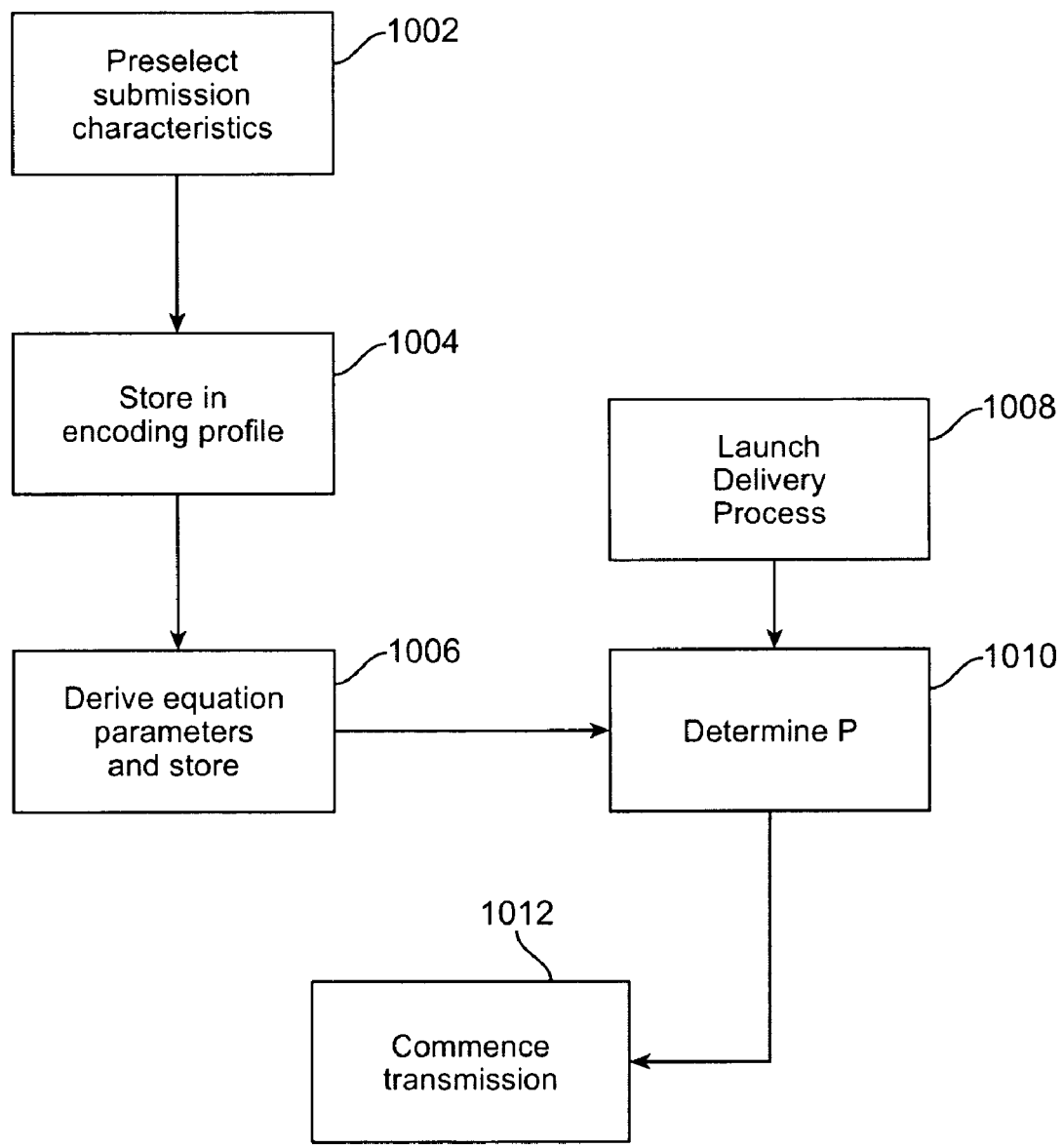
FIG. 10 is a flow diagram showing encoding parameter determination and use.

With reference to FIG. 10, first, at 1002, a latency time is determined. A data packet of known size $\zeta$ is produced and is transmitted to the desired location—for example from the client or user location 102 to the partner 104 website. The time the transmission was initiated is recorded. When the receiving computer acknowledges the receipt of the packet, the time is recorded and the difference is calculated, taking the return time of the acknowledgement into account, to produce the time it takes to transmit such packet referred to as $\Delta t$, or latency time. From the latency time, a data transfer rate M can be computed as:

$$M = \frac{\zeta}{\Delta t} \quad (1)$$

Thus, to ensure sustained video packet transmission while simultaneously encoding such packets in the data stream, a packet of compressed video data of size $\zeta$ or a multiple of size $\zeta$ should be produced in the time interval $\Delta t$ or multiple time interval of $\Delta t$.

Additionally a number N of frames can be set by the user to be transmitted in the time $\Delta t$ or multiple of time $\Delta t$ with a pre-determined quality index I. The higher the value of I, the greater the image quality, resulting in a greater file size. A GOP (group of pictures) can be interpreted as the minimum data packet to be transmitted. The number of frames inside the GOP is defined by the user or is determined automatically by the system.

For a data packet that contains a GOP with a fixed number of frames, the size in bytes can be determined by using the equation below:

$$GOPSize = \frac{1}{I} \times M \times \Delta t \quad (2)$$

Where the GOP size in turn is the sum of the sizes of the P, B and I frames that make it. Calling the sum of the sizes of all of the P frames $\rho$ and the sum of the sizes of all of the B frames $\beta$ and the size of the I frame $\gamma$, we obtain:

$$\rho + \beta + \gamma = \frac{1}{I} \times M \times \Delta t \quad (3)$$

By the GOP definition it is known that there is only one I frame, whose size and resolution can vary, but it can be set to be constant or constrained, for example, to be no greater than half of the original frame size. Therefore it is to be a constant and thus a known parameter. Also, B and P frames are relatively close in size except that the quality of the B frames is generally better than P frames as they both use adjacent frame information in their creation. Therefore, the number of B frames included in a GOP, if any, can be incorporated into the quality coefficient I. These assumptions produce the simplified equation below:

$$\rho = \frac{1}{I} \times M \times \Delta t - \gamma \quad (4)$$

To produce a constant bit rate stream that is optimized for a given connection or file transfer rate, a GOP must contain a number of P (or a combination of B and P) frames whose sizes add up to $\rho$ as shown in the above equation. The number of P (or a combination of B and P) frames can be pre-set by the user or it can be calculated by the system. Equation (4) can be simplified using (1) such that:

$$\rho = \frac{1}{I} \times \zeta - \gamma \quad (5)$$

Additionally, the quality of the interpolated frames themselves (P or B) is affected by the algorithms that create the vectors used in the motion estimation process. In general, algorithms that produce accurate motion vectors are time consuming and a balance must be reached when deciding how many interpolated frames are to be used in the GOP. Here, a quality motion estimation parameter $\mu$ is introduced where:

$$\frac{1}{\mu} \times \rho = \frac{1}{I} \times \zeta - \gamma \quad (6)$$

And if we solve for $\rho$ to find the optimum number of interpolated frames to be included in the GOP we have:

$$\rho = \frac{\mu}{I} \times \zeta - \gamma \quad (7)$$

The minimum interpolated frame (P or B) size in bytes is related to how much the picture has changed in adjacent frames. If the picture has not changed much, only the motion vector information will be sent in the video stream to represent that frame, reducing the overall file size.

Based on the above, it can be seen that the dynamic encoding process (DEP) has the advantage of producing a file with relatively constant video quality while being substantially simultaneously delivered through a network connection. If the network connection is a fast connection, the time used to compress the video is short. In this case, there is not enough time to compress the video much, which produces relatively larger file sizes with higher quality. But since the video file is being transferred through a fast connection, the file transfers will not be slowed down and the overall video throughput can be sustained at its maximum capacity. If on the other hand the network connection is slow, there will be more time available to compress the file which yields a smaller file size. Conventionally, higher compression ratios produce lower quality video in general because the algorithms for producing good quality compression are time consuming and often avoided. But in the present case, the system has the time to use complex algorithms that produce high quality compressed video whose file sizes can be substantially reduced. Since the file size will be reduced substantially, they can be delivered faster through a slow network connection.

Using the above determinations, and with reference to FIG. 10, the partner 104 can pre-select (Step 1002), and store (Step 1004) in the partner profile 306 for reference by the user 102, various characteristics of the data stream delivery for optimization for the partners particular needs. Such characteristics include image quality and delivery speed. Based on the these selections, one or more of the various parameters I, $\zeta$, $\mu$, and $\gamma$ from equation (7) above are derived by the administrator (Step 1006), and stored in the partner 104 encoding profile 306. Then, when the encoding and delivery process is launched from the user 102 location (Step 1008), the number $\rho$ of interpolated I-frames is determined (Step 1010), based on the specific connection that the user has with the partner, to achieve the delivery in the manner dictated by the partner. Transmission is then commenced (Step 1012).

Figure 11:
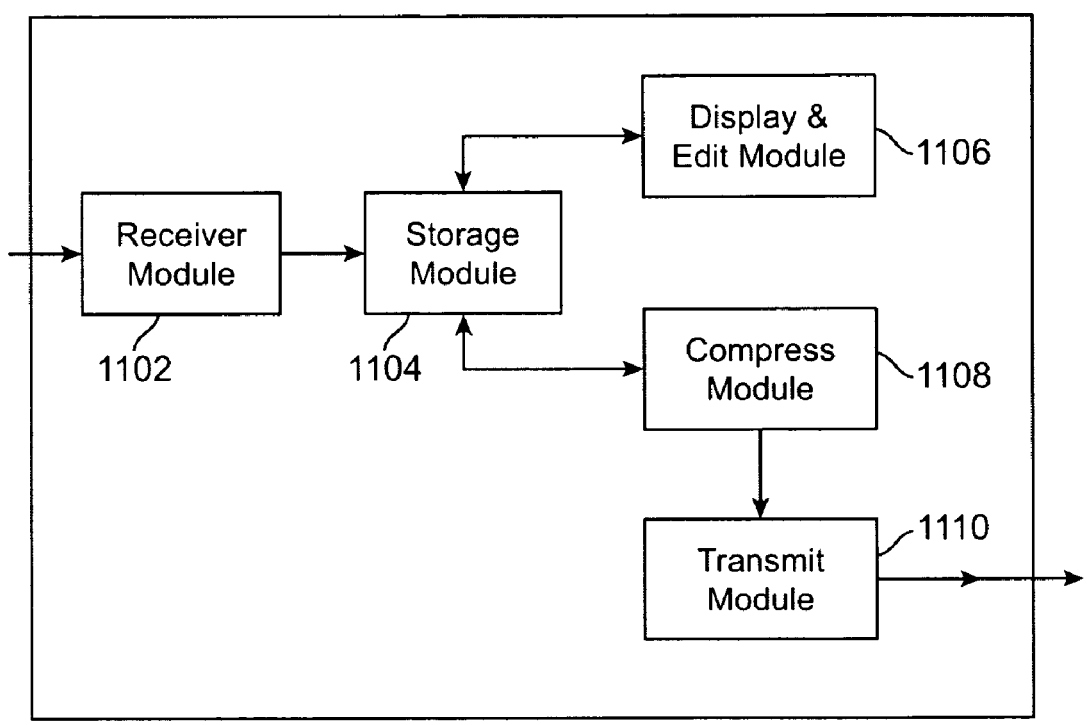
FIG. 11 is a block diagram showing various modules implementing portions of the AWE platform at a user location.

FIG. 11 depicts an exemplary application that can be implemented at the user 102 location for encoding and delivery of information. A receiver module 1102 receives a recording, preferably in a digital form according to a known commercial format, from an external source such as a DVCam, cellular telephone, or the like. A storage module 1104 then stores this recording, either in a buffer state or in more persistent form. An edit and display module 1106 facilitates interaction with the user, allowing the user to view and manipulate the recording, either in its native format or in a converted format optimized for viewing or manipulation. A compress module 1108 configured to implement the DEP process above can be initiated by the user to retrieve and compress/encode the recording, into the format desired by the partner 104, in the manner described above. A transmit module 1110 is configured to operate substantially simultaneously with the compress module 1108 to transmit the converted data stream to the partner website.

The above are exemplary modes of carrying out the invention and are not intended to be limiting. It will be apparent to those of ordinary skill in the art that modifications thereto can be made without departure from the spirit and scope of the invention as set forth in the following claims.

We claim:

1. A method for optimizing information delivery comprising:
   determining a data transfer rate; and
   encoding a data stream based on the data transfer rate,
   wherein said encoding comprises generating a group of pictures (GOP) having $\rho$ interpolated frames defined by:

$$\rho = \frac{\mu}{I} \times \zeta - \gamma$$

wherein $\zeta$ corresponds to packet size in packet transmission, $\gamma$ corresponds to I frame size, I corresponds to a pre-determined quality index, and $\mu$ corresponds to a quality motion estimation parameter.

2. A program storage device readable by a machine, embodying a program of instructions executable by the machine to perform method for optimizing information delivery, the method comprising:
   determining a data transfer rate; and
   encoding a data stream based on the data transfer rate,
   wherein said encoding comprises generating a group of pictures (GOP) having $\rho$ interpolated frames defined by:

$$\rho = \frac{\mu}{I} \times \zeta - \gamma$$

wherein $\zeta$ corresponds to packet size in packet transmission, $\gamma$ corresponds to I frame size, I corresponds to a pre-determined quality index, and $\mu$ corresponds to a quality motion estimation parameter.

* * * * *